(12) United States Patent
Kim

(10) Patent No.: US 11,719,266 B2
(45) Date of Patent: Aug. 8, 2023

(54) APPARATUS FOR REMOVING THERMAL STRATIFICATION GENERATED BY TURBULENT PENETRATION BY USING ROTATION RING

(71) Applicant: KEPCO ENGINEERING & CONSTRUCTION COMPANY, INC., Gyeongsangbuk-do (KR)

(72) Inventor: Kwang Chu Kim, Gimcheon-si (KR)

(73) Assignee: KEPCO ENGINEERING & CONSTRUCTION COMPANY, INC., Gyeongsangbuk-do (KR)

( * ) Notice: Subject to any disclaimer, the term of this patent is extended or adjusted under 35 U.S.C. 154(b) by 191 days.

(21) Appl. No.: 17/573,415

(22) Filed: Jan. 11, 2022

(65) Prior Publication Data

US 2022/0228610 A1 Jul. 21, 2022

(30) Foreign Application Priority Data

Jan. 18, 2021 (KR) .................. 10-2021-0006817

(51) Int. Cl.
*C02F 1/48* (2023.01)
*F15D 1/06* (2006.01)

(52) U.S. Cl.
CPC . *F15D 1/06* (2013.01); *C02F 1/48* (2013.01)

(58) Field of Classification Search
CPC ............ C02F 1/48; F02M 27/045; F15D 1/06
(Continued)

(56) References Cited

U.S. PATENT DOCUMENTS 5,024,759 A * 6/1991 McGrath ................ B01J 19/087
210/695
5,348,050 A * 9/1994 Ashton ................ F02M 27/045
210/222
(Continued)

FOREIGN PATENT DOCUMENTS

JP H06-063258 8/1994
JP H07-091447 4/1995
(Continued)

OTHER PUBLICATIONS

Korean Office Action (Application No. 2021-0006817) dated Jun. 20, 2022 (8pages).

*Primary Examiner* — Patrick F Brinson
(74) *Attorney, Agent, or Firm* — Nixon Peabody LLP; Jeffrey L. Costellia

(57) ABSTRACT

Provided is an apparatus for removing thermal stratification generated by turbulent penetration by using a rotation ring. The apparatus removes thermal stratification formed in a branch pipe branching from a main pipe through which a high-temperature fluid flows, the apparatus including: a hollow body portion coupled to the branch pipe; a plurality of first electromagnets provided to be spaced apart from each other in a circumferential direction of the body portion; a controller configured to sequentially change polarities of the plurality of first electromagnets; and a rotation ring including a plurality of second electromagnets having either an N polarity or an S polarity, the rotation ring being rotatably coupled to the body portion, wherein, when the polarities of the plurality of first electromagnets are sequentially changed, the rotation ring rotates according to a magnetic force of the plurality of first electromagnets and the plurality of second electromagnets.

10 Claims, 6 Drawing Sheets

(58) Field of Classification Search
USPC ........ 138/37–40, 44; 210/222, 695; 335/209
See application file for complete search history.

(56) References Cited

U.S. PATENT DOCUMENTS

| | | | | |
|---|---|---|---|---|
| 5,411,143 | A * | 5/1995 | Greene | .................... C02F 1/482 |
| | | | | 210/695 |
| 5,783,074 | A * | 7/1998 | Stanley | .................. B82Y 15/00 |
| | | | | 210/222 |
| 5,918,636 | A * | 7/1999 | Mitchell | ................. C02F 1/482 |
| | | | | 210/222 |
| 6,602,411 | B1 * | 8/2003 | Aida | ....................... C02F 1/481 |
| | | | | 210/243 |
| 9,725,789 | B2 | 8/2017 | Nam et al. | |
| 2006/0226060 | A1 * | 10/2006 | Mercer | ................... C02F 1/006 |
| | | | | 204/557 |
| 2014/0144826 | A1 * | 5/2014 | Mason | ................ F02M 27/045 |
| | | | | 210/222 |

FOREIGN PATENT DOCUMENTS

| | | |
|---|---|---|
| JP | 4737992 | 8/2011 |
| JP | 6118315 | 4/2017 |
| KR | 20-0151829 | 7/1999 |
| KR | 2012-0001413 | 1/2012 |

\* cited by examiner

APPARATUS FOR REMOVING THERMAL STRATIFICATION GENERATED BY TURBULENT PENETRATION BY USING ROTATION RING

CROSS-REFERENCE TO RELATED APPLICATION

This application is based on and claims priority under 35 U.S.C. § 119 to Korean Patent Application No. 10-2021-0006817, filed on Jan. 18, 2021, in the Korean Intellectual Property Office, the disclosure of which is incorporated by reference herein in its entirety.

BACKGROUND

1. Field

The present disclosure relates to an apparatus for removing thermal stratification generated by turbulent penetration by using a rotation of a rotation ring, and more particularly, to removal of thermal stratification generated by turbulence penetrating into a branch pipe by using a rotation of a rotation ring. The present disclosure relates to an apparatus for removing thermal stratification by controlling polarities of electromagnets provided in a body portion to be sequentially changed, and causing a rotation ring provided inside the body portion to rotate according to a change in the polarities of the electromagnets so that a fluid inside a branch pipe is rotated.

2. Description of the Related Art

The present disclosure relates to an apparatus for removing thermal stratification generated by penetration of turbulent eddies from a main pipe through which a high-temperature and high-flow fluid flows into a dead-end branch pipe in various industrial plants.

In detail, as shown in FIG. 1, when the branch pipe is coupled to the main pipe through which the fluid flows, and the branch pipe is isolated by a valve, turbulent eddies penetrate into the branch pipe at an initial stage of plant operation. Such turbulent penetration generates thermal stratification in a horizontal pipe portion of an elbow pipe, as shown in FIG. 2.

Such a thermal stratification phenomenon may generate a bending stress due to a difference in the thermal expansion between the upper end lower parts of a pipe wall, thereby causing serious deformation of the pipe and a support thereof. In particular, when the thermal stratification phenomenon repeats periodically, cracks due to thermal fatigue may occur. In the case of a plant where safety is important, such as a nuclear power plant, it is extremely important to prevent serious damage caused by thermal stratification.

SUMMARY

In order to solve the aforementioned problems, the present disclosure provides an apparatus for removing thermal stratification generated by turbulence penetrating into a branch pipe by using a rotation of a rotation ring.

Additional aspects will be set forth in part in the description which follows and, in part, will be apparent from the description, or may be learned by practice of the presented embodiments of the disclosure.

According to an embodiment of the present disclosure, an apparatus for removing thermal stratification generated by turbulent penetration by using a rotation ring, which is apparatus for removing thermal stratification formed in a branch pipe branching from a main pipe through which a high-temperature fluid flows, includes: a hollow body portion coupled to the branch pipe; a plurality of first electromagnets provided to be spaced apart from each other in a circumferential direction of the body portion; a controller configured to sequentially change polarities of plurality of the first electromagnets; and a rotation ring including a plurality of second electromagnets having either an N polarity or an S polarity, the rotation ring being rotatably coupled to the body portion, wherein, when the polarities of the plurality of first electromagnets are sequentially changed, the rotation ring rotates according to a magnetic force of the plurality of first electromagnets and the plurality of second electromagnets, and wherein the apparatus removes thermal stratification formed in the branch pipe branching from a main pipe through which a high-temperature fluid flows.

Also, the branch pipe may include a first branch pipe branching from the main pipe, an elbow pipe connected to the first branch pipe to change a flow direction of the fluid, and a second branch pipe connected to the elbow pipe, wherein the body portion may be between the elbow pipe and the second branch pipe.

Also, the plurality of first electromagnets may be provided at intervals of 45° in a circumferential direction of the body portion, and the plurality of second electromagnets may be provided in a pair facing each other.

Also, an inner diameter of the body portion and an inner diameter of the rotation ring may be equal to an inner diameter of the branch pipe.

Also, an insertion groove into which the rotation ring is inserted may be formed inside the body portion.

Also, magnetic materials having a same polarity as the plurality of second electromagnets provided on the rotation ring may be provided on both sides of the insertion groove facing side surfaces of the rotation ring.

Also, protrusions may be formed to protrude and to be spaced apart from each other at certain intervals on an inner circumferential surface of the rotation ring.

Also, the protrusions may be arranged at intervals of 90° on the inner circumferential surface of the rotation ring.

Also, an insertion groove into which the rotation ring is inserted may be formed inside the body portion, and a width of the insertion groove may be greater than a width of the rotation ring, and an outer diameter of the insertion groove, formed when a bottom surface of the insertion groove is connected, may be greater than an outer diameter of the rotation ring.

Also, the body portion may include a first body coupled to one side of the branch pipe and including a first coupling hole spaced apart in a circumferential direction, and a second body coupled to other side of the branch pipe and including a second coupling hole spaced apart in a circumferential direction, the second coupling hole facing the first coupling hole, the first body and the second body may be fastened by a fastening member inserted into the first coupling hole and the second coupling hole, and the first body may include a groove portion having one open side so that the rotation ring is inserted thereinto, and when the second body is fastened to the first body, the second body may block the open side of the groove portion to form the insertion groove into which the rotation ring is inserted.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
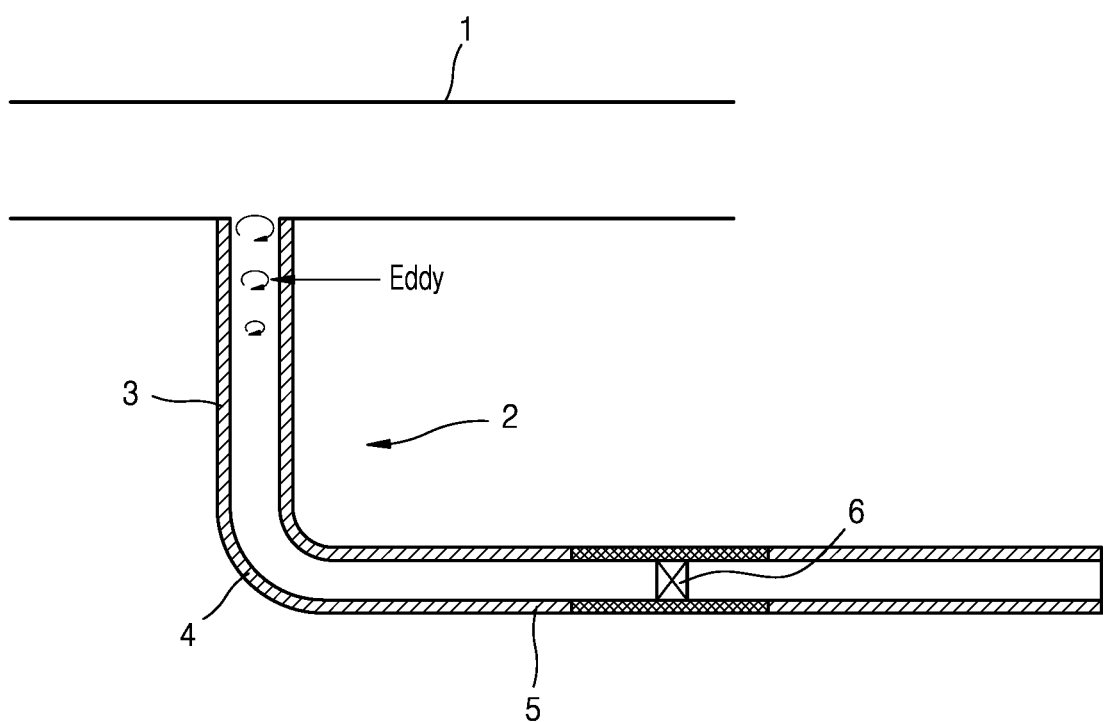
FIG. 1 is a diagram illustrating a state in which turbulence penetrates into a branch pipe.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Hereinafter, various embodiments of the present disclosure will be described with reference to the accompanying drawings. As the present disclosure allows for various changes and numerous embodiments, certain embodiments will be illustrated in the drawings and described in the detailed description. However, various embodiments are not intended to limit the present disclosure to certain embodiments, and should be construed as including all changes, equivalents, and/or alternatives included in the spirit and scope of various embodiments of the present disclosure. With regard to the description of the drawings, similar reference numerals may be used to refer to similar elements.

Expressions such as "include" or "may include" that may be used in various embodiments of the present disclosure specify the presence of a corresponding function, operation, or element, and do not preclude the presence or addition of one or more functions, operations, or elements. Also, it will be understood that terms such as "include" or "comprise" as used in various embodiments of the present disclosure specify the presence of stated features, numbers, steps, operations, elements, parts, and combinations thereof, but do not preclude in advance the presence or addition of one or more other features, numbers, steps, operations, elements, parts, combinations thereof.

It will be understood that when an element is referred to as being "connected" or "coupled" to another element, it may be directly connected to the other element, or intervening elements may exist between the element and the other element. On the other hand, it will be understood that when an element is referred as being "directly connected" or "directly coupled" to another element, intervening elements may not exist between the element and the other element.

Terms used in various embodiments of the present disclosure are merely used to describe certain embodiments, and are not intended to limit various embodiments of the present disclosure. As used herein, the singular forms "a," "an," and "the" are intended to include the plural forms as well, unless the context clearly indicates otherwise.

Unless otherwise defined, all terms used herein including technical or scientific terms have the same meanings as commonly understood by those of ordinary skill in the art to which various embodiments of the present disclosure pertain.

Terms such as those defined in commonly used dictionaries should be interpreted as having meanings consistent with the meanings in the context of the related art, and should not be interpreted in an idealized or overly formal sense, unless explicitly defined in various embodiments of the present disclosure.

Hereinafter, preferred embodiments according to the present disclosure will be described in detail with reference to the accompanying drawings.

Figure 2:
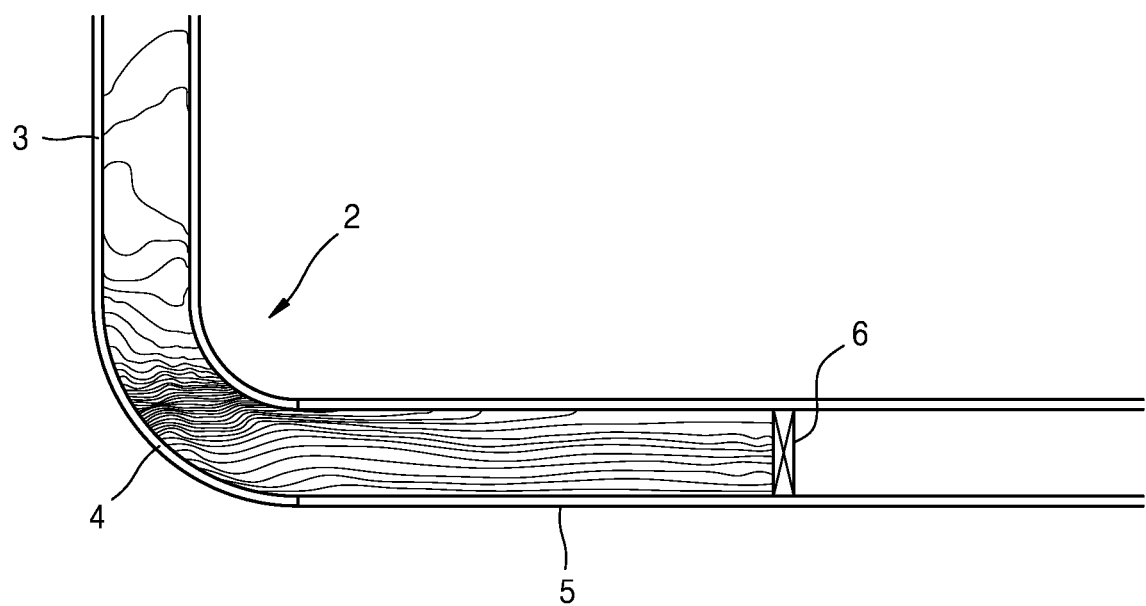
FIG. 2 is a diagram illustrating a state in which thermal stratification is formed in a branch pipe.
Figure 3:
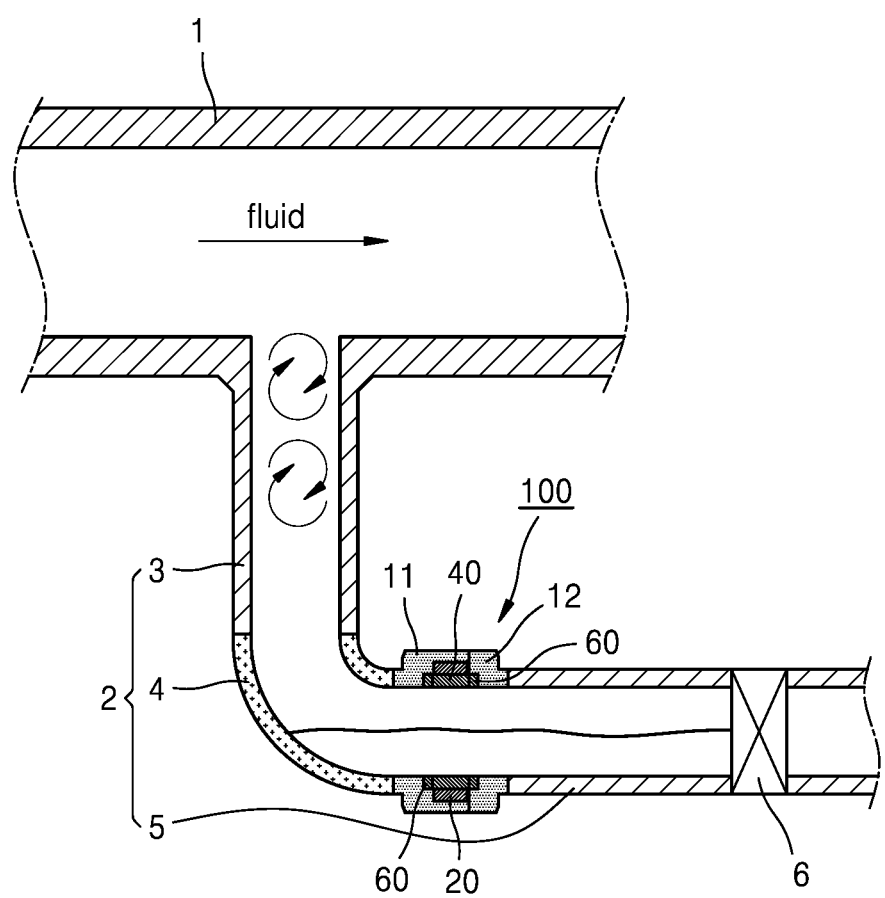
FIG. 3 is a cross-sectional view of a state in which an apparatus for removing thermal stratification is coupled to a branch pipe.
Figure 4:
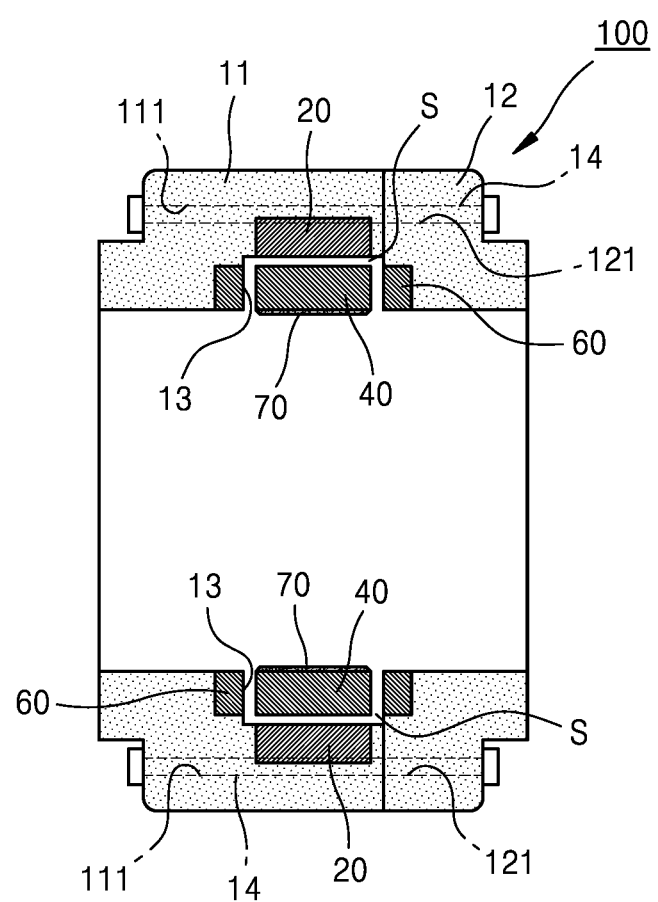
FIG. 4 is an enlarged cross-sectional view of an apparatus for removing thermal stratification according to the present disclosure.
Figure 5:
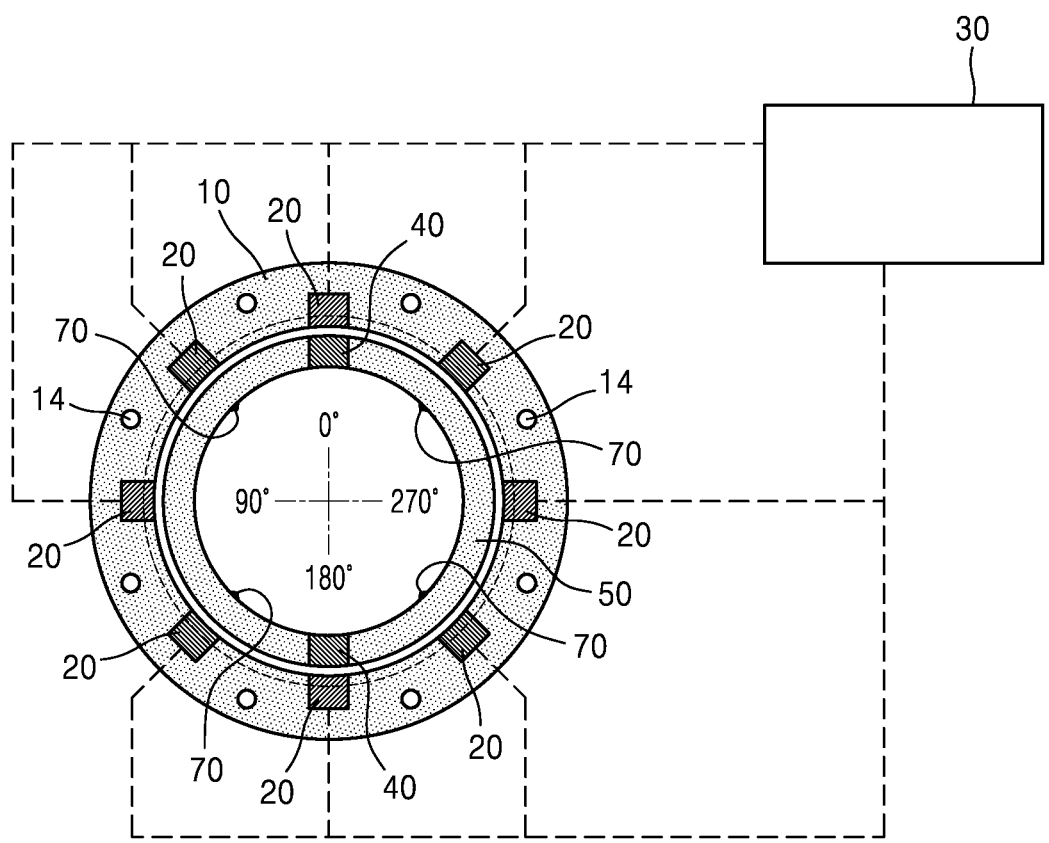
FIG. 5 is a diagram illustrating polarities of electromagnets in a state before a rotation ring rotates.
Figure 6:
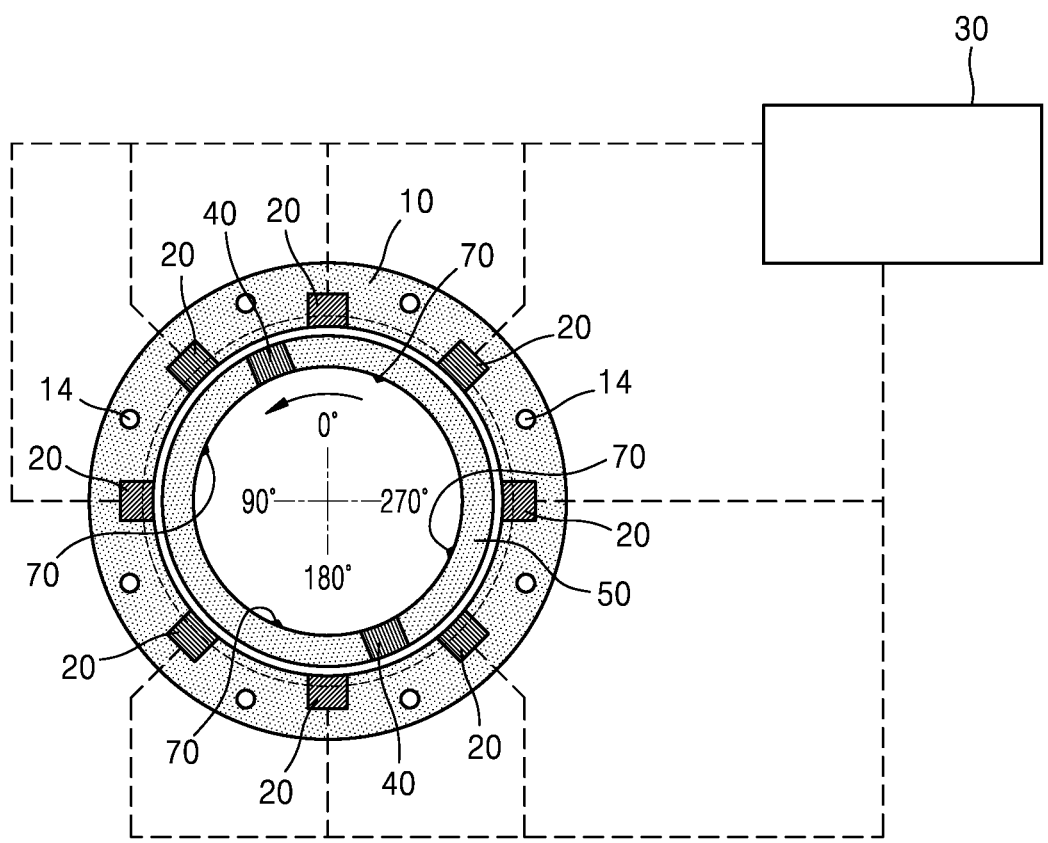
FIG. 6 is a diagram illustrating polarities of electromagnets in a state in which a rotation ring starts rotating.

FIG. 1 is a diagram illustrating a state in which turbulence penetrates into a branch pipe, and FIG. 2 is a diagram illustrating a state in which thermal stratification is formed in a branch pipe. FIG. 3 is a cross-sectional view of a state in which an apparatus for removing thermal stratification is coupled to a branch pipe, and FIG. 4 is an enlarged cross-sectional view of an apparatus for removing thermal stratification according to the present disclosure. FIG. 5 is a diagram illustrating polarities of electromagnets in a state before a rotation ring rotates, and FIG. 6 is a diagram illustrating polarities of electromagnets in a state in which a rotation ring starts rotating.

First, an apparatus 100 for removing thermal stratification generated by turbulent penetration by using a rotation ring, according to the present disclosure, is an apparatus for removing thermal stratification generated in a branch pipe 2 when a main pipe 1, through which a high-temperature and high-flow fluid flows, is coupled to the branch pipe 2 that causes the flow of the fluid to branch from the main pipe 1, in various industrial plants. When the branch pipe 2 is closed by a valve 6 at the initial stage of plant operation, turbulent eddies penetrate into the dead-end branch pipe 2. The present disclosure provides an apparatus for removing thermal stratification generated by penetration of turbulence into the stagnant branch pipe 2.

Referring to FIG. 3, an apparatus 100 for removing thermal stratification generated by turbulent penetration by using a rotation ring is an apparatus for removing thermal stratification formed in a branch pipe 2 that branches from a main pipe 1, through which a high-temperature fluid flows, and has a fluid with a flow volume less than that of the main pipe 1 flowing therethrough. According to the present embodiment, the apparatus 100 for removing thermal stratification includes a body portion 10, a first electromagnet 20, a controller 30, a second electromagnet 40, and a rotation ring 50.

Referring to FIGS. 3 and 4, the body portion 10 is a hollow member coupled to the branch pipe 2. The body portion 10 includes a first body 11 coupled to one side of the branch pipe 2 and including a first coupling hole 111 spaced apart in a circumferential direction, and a second body 12 coupled to the other side of the branch pipe 2 and including a second coupling hole 121 spaced apart in a circumferential direction, the second coupling hole 121 facing the first coupling hole 111. The first body 11 and the second body 12 are coupled to each other to form one body portion 10 and have a hollow shape so that a fluid may flow therein.

The first electromagnet 20 is provided as a plurality of first electromagnets 20 to be spaced apart from each other in a circumferential direction of the body portion 10. According to the present embodiment, the first electromagnets 20 are arranged to be spaced apart from each other at certain intervals along an inner circumferential surface of the body portion 10. The first electromagnets 20 are spaced apart from each other at intervals of 45°, and polarities of the first electromagnets 20 are sequentially changed when the apparatus 100 for removing thermal stratification according to the present disclosure operates.

In detail, as shown in FIG. 5, before the rotation ring 50 rotates, the first electromagnets 20 arranged at 0° and 180° have an N polarity, and the first electromagnets 20 arranged at 45°, 90°, 135°, 225°, 270°, and 315° have an S polarity (hereinafter, angles in FIGS. 5 and 6 are indicated based on a counterclockwise direction). The first electromagnets 20 facing each other (two first electromagnets arranged at intervals of 180°) are arranged to have the same polarity.

The controller 30 is provided to sequentially change the polarities of the first electromagnets 20. Referring to FIGS. 5 and 6, when it is described based on the rotation ring 50 rotating counterclockwise, the controller 30 sequentially changes the polarities of the first electromagnets 20 as follows. The controller 30 changes the polarities of the first electromagnets 20 arranged at 0° and 180° from the N polarity to the S polarity, and then changes the polarities of the first electromagnets 20 arranged at 45° and 225° from the S polarity to the N polarity (returning back to the S polarity after the rotation ring 50 rotates). Thereafter, the controller 30 changes the polarities of the first electromagnets 20 arranged at 90° and 270° from the S polarity to the N polarity, and then changes the polarities of the first electromagnets 20 arranged at 135° and 315° from the S polarity to the N polarity. As described above, when it is described based on the rotation ring 50 rotating counterclockwise, the controller 30 sequentially changes the polarities of a pair of first electromagnets 20 facing each other in the counterclockwise direction. The rotation ring 50 may rotate clockwise, and in this case, the controller 30 may sequentially change the polarities of the pair of first electromagnets 20 facing each other in a clockwise direction in the same manner.

The rotation ring 50 is rotatably coupled to the body portion 10. The rotation ring 50 is formed as a circular ring inserted into the body portion 10, and when the rotation ring 50 rotates, an inner circumferential surface of the rotation ring 50 comes into contact with a fluid flowing through the branch pipe 2. The rotation ring 50 includes a second electromagnet 40 having either the N polarity or the S polarity, and when the polarities of the first electromagnets 20 are sequentially changed, the rotation ring 50 automatically rotates by a magnetic force. When the rotation ring 50 rotates, it means that the rotation ring 50 rotates around the center of a diameter of the branch pipe 2.

According to the present embodiment, the second electromagnet 40 is provided as a pair facing each other. As shown in FIG. 5, based on a moment when the rotation ring 50 stops rotating, the pair of second electromagnets 40 are arranged at 0° and 180°, and the second electromagnets 40 have the same polarity, that is, an S polarity.

According to the present embodiment, an inner diameter of the body portion 10 and an inner diameter of the rotation ring 50 are formed to be equal to an inner diameter of the branch pipe 2. An insertion groove 13 into which the rotation ring 50 is inserted is formed inside the body portion 10. In a state in which the rotation ring 50 is inserted into the insertion groove 13, the inner diameter of the rotation ring 50 is formed to be equal to the inner diameter of the branch pipe 2. The inner circumferential surface of the rotation ring 50 and the inner circumferential surface of the body portion 10 form a pipe wall together with an inner circumferential surface of the branch pipe 2. The rotation of the rotation ring 50 acts as though a part of the pipe wall is rotated.

As shown in FIG. 3, according to the present embodiment, the branch pipe 2 includes a first branch pipe 3, an elbow pipe 4, and a second branch pipe 5. The first branch pipe 3 is a pipe directly connected to the main pipe 1 so that the fluid flowing through the main pipe 1 branches therefrom. The elbow pipe 4 is a curved pipe which is connected to the first branch pipe 3 and provided to change a flow direction of the fluid. The second branch pipe 5 is a pipe connected to the elbow pipe 4 to transfer the fluid branching from the main pipe 1 to a certain location, and is provided as a straight line according to the present embodiment.

In the apparatus 100 for removing thermal stratification generated by turbulent penetration using the rotation ring according to the present embodiment, in the case of the branch pipe 2 including the elbow pipe 4 as described above, the body portion 10 is between the elbow pipe 4 and the second branch pipe 5.

As shown in FIG. 2, in a pipe system including the elbow pipe 4, in which the flow direction of the fluid is changed, during operation, thermal stratification is generated at a point where the elbow pipe 4 and the second branch pipe 5 extending in a straight line come into contact and affects surrounding parts. Accordingly, the apparatus 100 for removing thermal stratification according to the present disclosure is provided at a point where the elbow pipe 4 and the second branch pipe 5 come into contact, so that concentrated formation of thermal stratification may be eliminated at an initial stage. The first body 11 is coupled to the elbow pipe 4, the second body 12 is coupled to the second branch pipe 5, and the rotation ring 50 is installed by being inserted into the insertion groove 13 formed as the first body 11 and the second body 12 are combined.

The structure and coupling relationship of the body portion 10 and the rotation ring 50 will be described in greater detail.

As shown in FIGS. 4 and 5, according to the present embodiment, the first body 11 and the second body 12 of the body portion 10 are fastened by a fastening member 14. The fastening member 14 is inserted into the first coupling hole 111 of the first body 11 and the second coupling hole 121 of the second body 12, and the first and second coupling holes 111 and 121 are provided in the circumferential directions of the first and second bodies 11 and 12, so that the fastening member 14 are provided as a plurality of fastening members 14. The fastening member 14 may pass through the first coupling hole 111 and the second coupling hole 121, and a nut may be coupled and fixed to an end of the fastening member 14.

The first body 11 includes a groove portion having one open side so that the rotation ring 50 is inserted thereinto. In addition, when the second body 12 is fastened to the first body 11, the second body 12 blocks the open side of the groove portion to form the insertion groove 13 into which the rotation ring 50 is inserted.

According to present embodiment, the first electromagnets 20 of the body portion 10 are arranged so that a pair of electromagnets facing each other rotate clockwise or counterclockwise and sequentially have opposite polarities. When a pair of first electromagnets 20 facing each other and arranged at intervals of 180° is referred to as a pair of electromagnets, the pair of electromagnets are provided as a plurality of electromagnets and rotate clockwise or counterclockwise, and the polarities thereof are sequentially changed. A pair of second electromagnets 40 of the rotation ring 50 are provided to face each other, and the polarities of the second electromagnets 40 facing each other are the same.

As shown in FIG. 5, before the rotation ring 50 rotates, the first electromagnets 20 of the body portion 10 and the second electromagnets 40 of the rotation ring 50 have opposite polarities and are arranged to face each other. Accordingly, because an attractive force acts between the first electromagnets 20 and the second electromagnets 40, the rotation ring 50 does not rotate and maintains a stationary state.

As shown in FIG. 6, the polarities of the first electromagnets 20 of the body portion 10 are sequentially changed, and the rotation ring 50 is rotated by a magnetic force of the first electromagnets 20 and the second electromagnets 40. Based on the rotation ring 50 rotating counterclockwise, an initial polarity change when the rotation ring 50 rotates is as follows. The polarities of the first electromagnets 20 arranged at 0° and 180° are changed from the N polarity to the S polarity, and then, the polarities of the first electromagnets 20 arranged at 45° and 225° are changed from the S polarity to the N polarity. A repulsive force acts in the second electromagnets 40 initially arranged at 0° and 180° and having the S polarity as the polarities of the first electromagnets 20 arranged at 0° and 180° are changed from the N polarity to the S polarity, and an attractive force that attracts the second electromagnets 40 acts as the polarities of the first electromagnets 20 arranged at 45° and 225° are changed from the S polarity to the N polarity. Accordingly, the rotation ring 50 rotates counterclockwise. As the polarities of the first electromagnets 20 are sequentially changed as described above, the rotation ring 50 continuously rotates.

Also, according to the present embodiment, magnetic materials 60 having the same polarity as the second electromagnets 40 provided on the rotation ring 50 are provided on both sides of the insertion groove 13 facing side surfaces of the rotation ring 50. In addition, a width of the insertion groove 13 is greater than a width of the rotation ring 50, and an outer diameter of the insertion groove 13, formed when the bottom surface of the insertion groove 13 is connected, is greater than an outer diameter of the rotation ring 50. That is, when the rotation ring 50 is inserted into the insertion groove 13, the rotation ring 50 may be arranged with a certain space from both sides and the bottom surface of the insertion groove 13. Such arrangement is made possible by polarities of the first electromagnets 20 of the body portion 10, the second electromagnets 40 of the rotation ring 50, and the magnetic materials 60.

In detail, a repulsive force acts between the magnetic materials 60 and the rotation ring 50, so that the rotation ring 50 may be spaced apart from both sides of the insertion groove 13 by a certain distance and may rotate. That is, a certain gap is formed between the side surfaces of the rotation ring 50 and both sides of the insertion groove 13.

Also, before the rotation ring 50 rotates, the first electromagnets 20 of the body portion 10 and the second electromagnets 40 of the rotation ring 50 have opposite polarities and face each other, so that an attractive force acts between the first electromagnets 20 and the second electromagnets 40. Because the attractive force acts equally at 0° and 180° points, the rotation ring 50 may be spaced apart from the body portion 10 by a certain space. In addition, at a point when the rotation ring 50 starts rotating, the first electromagnets 20 of the body portion 10 and the second electromagnets 40 of the rotation ring 50 have the same polarity and push each other. Because such a repulsive force acts as 0° and 180°, the body portion 10 and the rotation ring 50 are spaced apart from each other by a certain space and start rotating. When the polarities of the first electromagnets 20 are sequentially changed and the first electromagnets 20 are rotated, a repulsive force acts between the first electromagnets 20 and the second electromagnets 40 at a point where the first electromagnets 20 and the second electromagnets 40 face each other, so that the body portion 10 and the rotation ring 50 may maintain a certain distance from each other and rotate. Because such gaps are filled with fluids to form thin films, direct friction between solid walls is avoided during rotation, thereby enabling smooth rotation.

According to an embodiment of the present disclosure, the controller 30 controls changing the polarities of the first electromagnets 20 and is connected to the first electromagnets 20 by an electric wire. The controller 30 may be arranged adjacent to and spaced apart from the body portion 10 and thus is not disrupted by installation of additional components such as an insulation or the like in the branch pipe 2. Accordingly, the apparatus 100 for removing thermal stratification according to the present disclosure is applicable to various branch pipes 2.

According to the present embodiment, protrusions 70 that increase the rotation of the fluid are formed to protrude from the inner circumferential surface of the rotation ring 50. When the valve 6 provided in the branch pipe 2 is open to allow the flow of the fluid, each of the protrusions 70 is formed in a size that does not affect the flow of the fluid in the branch pipe 2, for example, about 3% to about 5% of the inner diameter of the branch pipe 2.

According to the present embodiment, the protrusions 70 are formed to protrude and to be spaced apart from each other at certain intervals on the inner circumferential surface of the rotation ring 50. A cross-section of each of the protrusions 70 has a substantially triangular shape and is formed to increase a rotational force of the fluid when the rotation ring 50 rotates in a state in which the valve 6 is closed, and is also formed to an extent that does not interfere with the flow of the fluid and cause no pressure drop when the valve 6 is opened and the fluid flows through the second branch pipe 5. According to the present embodiment, the protrusions 70 are provided as four protrusions 70 arranged at intervals of 90° on the inner circumferential surface of the rotation ring 50. The number of the protrusions 70 is not limited to four, but because the flow of the fluid may be inhibited as the number of the protrusions 70 increases, three or four protrusions 70 may be formed.

Hereinafter, the operation and effect of the apparatus 100 for removing thermal stratification generated by turbulent penetration using the rotation ring 50 according to the aforementioned configuration will be described in detail.

In industrial plants, the main pipe 1 through which a high-temperature and high-flow fluid flows is provided, and the branch pipe 2 branching from the main pipe 1 to supply the fluid to a desired location is provided. According to the present embodiment, the branch pipe 2 branching from the main pipe 1 is provided by being connected in order from the main pipe 1 to the first branch pipe 3, the elbow pipe 4, and the second branch pipe 5.

When the fluid flows along the main pipe 1 and does not flow along the branch pipe 2, the valve 6 provided in the branch pipe 2 is closed, for example, at an initial stage of operation or according to necessary conditions. In this case, a turbulent penetration phenomenon occurs in which the fluid flowing along the main pipe 1 penetrates into the branch pipe 2, and thermal stratification is formed by the turbulent penetration phenomenon. As in the present embodiment, in the case of the branch pipe 2 including the elbow pipe 4, thermal stratification is actively generated at a point where the elbow pipe 4 and the second branch pipe 5 are connected, and spreads to the second branch pipe 5.

The apparatus 100 for removing thermal stratification generated by turbulent penetration using the rotation ring, according to the embodiment of the present disclosure, is between the elbow pipe 4 and the second branch pipe 5. According to the embodiment of the present disclosure, the apparatus 100 for removing thermal stratification is modularized and manufactured in advance, and then coupled between the elbow pipe 4 and the second branch pipe 5. An open groove portion into which the rotation ring 50 is inserted is formed in the first body 11, the rotation ring 50 is inserted into the open groove portion, and the second body 12 is arranged adjacent to the groove portion, and then the first and second bodies 11 and 12 are fastened by the fastening member 14. By the process as described above, the rotation ring 50 may be easily accommodated in the body portion 10 to be modularized.

The first electromagnets 20 are provided on the inner circumferential surface of the body portion 10 to be spaced apart from each other at certain intervals, and the pair of second electromagnets 40 are provided on the rotation ring 50 to face each other. In the first electromagnets 20, a pair of electromagnets facing each other have the same polarity, and other first electromagnets 20 adjacent to each other have opposite polarities. Before the apparatus 100 for removing thermal stratification according to the present disclosure operates, the rotation ring 50 maintains a stationary state with respect to the body portion 10. As in FIG. 5, because the first electromagnets 20 of the body portion 10 and the second electromagnets 40 of the rotation ring 50 have opposite polarities and face each other, the rotation ring 50 does not rotate by an attractive force between the first electromagnets 20 and the second electromagnets 40.

As shown in FIG. 6, the polarities of the first electromagnets 20 are sequentially changed to rotate the rotation ring 50. In detail, as the polarities of the first electromagnets 20 arranged at 0° and 180° are changed from the N polarity to the S polarity, a repulsive force is generated between the first electromagnets 20 and the second electromagnets 40 having the S polarity, and as the polarities of the first electromagnets 20 arranged at 45° and 225° are changed from the S polarity to the N polarity, the first electromagnets 20 attract the second electromagnets 40 and are rotated counterclockwise. When the second electromagnets 40 are rotated counterclockwise by 45°, as the polarities of the first electromagnets 20 arranged at 45° and 225° are changed again from the N polarity to the S polarity, a repulsive force is generated between the first electromagnets 20 and the second electromagnets 40, and as the polarities of the first electromagnets 20 arranged at 90° and 270° are changed from the S polarity to the N polarity, the first electromagnets 20 attract the second electromagnets 40 and are further rotated counterclockwise. When the second electromagnets 40 are rotated counterclockwise by 90°, as the polarities of the first electromagnets 20 arranged at 90° and 270° are changed again from the N polarity to the S polarity, a repulsive force is generated between the first electromagnets 20 and the second electromagnets 40, and as the polarities of the first electromagnets 20 arranged at 135° and 315° are changed from the S polarity to the N polarity, the first electromagnets 20 attract the second electromagnets 40 and are further rotated counterclockwise. When the second electromagnets 40 are rotated counterclockwise by 135°, as the polarities of the first electromagnets 20 arranged at 135° and 315° are changed again from the N polarity to the S polarity, a repulsive force is generated between the first electromagnets 20 and the second electromagnets 40, and as the polarities of the first electromagnets 20 arranged at 0° and 180° are changed from the S polarity to the N polarity, the first electromagnets 20 attract the second electromagnets 40 and are rotated counterclockwise by half a turn. As the polarities of the first electromagnets 20 are changed as described above, the rotation ring 50 rotates by the remaining half a turn to complete one rotation. The controller 30 repeats changing the polarities of the first electromagnets 20 up to the one rotation so that the rotation ring 50 continuously rotates by a magnetic force.

As the rotation ring 50 rotates, a viscous fluid is rotated together with the rotation ring 50 and mixed. As the fluid is mixed, thermal stratification at a point where the elbow pipe 4 and the second branch pipe 5 are connected is removed.

As described above, the apparatus 100 for removing thermal stratification generated by turbulent penetration using the rotation ring, according to the embodiment of the present disclosure, efficiently removes thermal stratification generated by turbulent eddies penetrating into the branch pipe 2 closed by the valve 6.

As the polarities of the first electromagnets 20 of the body portion 10 are sequentially changed, the rotation ring 50 rotates in a groove having a gap by a magnetic force, so that there is no concern about mechanical wear of the rotation ring 50, and because the rotation ring 50 is arranged inside the body portion 10, leakage of the fluid may be prevented.

Also, the apparatus 100 for removing thermal stratification is modularized as described above and thus may be easily installed without changing the existing pipe network, and the apparatus 100 for removing thermal stratification is between the elbow pipe 4 and the second branch pipe 5 and thus provides easy maintenance. Accordingly, the apparatus 100 for removing thermal stratification may be easily installed in plants in operation or in which construction is completed or is in progress.

When the valve 6 of the branch pipe 2 is opened and the fluid flows through the branch pipe 2, in the apparatus 100 for removing thermal stratification according to the present disclosure, a separate structure is not installed inside a pipe, which does not interfere with the flow of the fluid, and thus, pressure loss does not occur. Also, because scattered materials are not generated due to damage of the separate structure, additional device damage due to the scattered materials may be prevented in advance, and when the apparatus 100 for removing thermal stratification is applied to a nuclear power plant, safety may be greatly improved.

The apparatus 100 for removing thermal stratification according to the present disclosure may sufficiently remove thermal stratification without rotating the rotation ring 50 at a high speed. For example, a sufficient effect may be achieved at a speed of about 10 revolutions/minute to about 13 revolutions/minute (10 rpm to 13 rpm). Also, when the valve 6 of the branch pipe 2 is opened and the fluid flows through the branch pipe 2, the apparatus 100 for removing thermal stratification according to the present disclosure may be stopped, so that a large electric load is not required for the operation.

In addition, because the thermal stratification is blocked in advance, a pipe integrity evaluation on thermal stratification or thermal fatigue through experiments or computational analysis may be omitted, and because there is no need to install an ultrasonic monitoring facility or the like to check the condition of the inside of a pipe, costs required for facilities may be reduced.

The apparatus for removing thermal stratification generated by turbulent penetration using the rotation ring, according to the present disclosure, may remove thermal stratification generated by turbulence penetrating into a branch pipe by using the rotation of the rotation ring.

Also, a polarity of an electromagnet provided in the body portion is controlled to be sequentially changed, and the rotation ring is caused to rotate according to a change in the polarity of the electromagnet, so that the thermal stratification may be removed with a relatively small rotational force, and pipe vibration or the like may not be affected.

In addition, the apparatus for removing thermal stratification may be modularized and installed, and thus, installation thereof is possible without changing the layout of the existing pipe network.

Moreover, when the branch pipe includes a first branch pipe, an elbow pipe, and a second branch pipe, during operation, thermal stratification starts at a point where the elbow pipe and the second branch pipe are connected, the apparatus for removing thermal stratification according to the present disclosure is installed at the point where the elbow pipe and the second branch pipe are connected and efficiently removes the thermal stratification with a small rotational force in the initial stage.

Also, because a separate structure colliding with a fluid in the pipe to remove thermal stratification is not installed, the fluid may smoothly flow to prevent pressure drop loss due to the separate structure in advance. Further, because the separate structure is not installed, not only costs may be reduced, but also device damage caused by the separate structure being damaged by the flow of the fluid may be prevented. That is, when the structure is damaged due to the flow of the fluid, fragments may be generated, and the fragments may cause serious damage not only to the pipe system but also to other devices into which the fluid flows. The present disclosure may prevent such damage. When the present disclosure is applied to a nuclear power plant, accidents caused by the fragments may be prevented, thereby greatly improving safety.

Also, because thermal stratification generated in the branch pipe is removed in advance, the installation of ultrasonic monitoring equipment for pipe integrity evaluation may be omitted, thereby reducing enormous costs required for such equipment.

It should be understood that embodiments described herein should be considered in a descriptive sense only and not for purposes of limitation. Descriptions of features or aspects within each of the embodiments should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. An apparatus for removing thermal stratification generated by turbulent penetration by using a rotation ring, which is apparatus for removing thermal stratification formed in a branch pipe branching from a main pipe through which a high-temperature fluid flows, the apparatus comprising:
   a hollow body portion coupled to the branch pipe;
   a plurality of first electromagnets provided to be spaced apart from each other in a circumferential direction of the body portion;
   a controller configured to sequentially change polarities of the plurality of first electromagnets; and
   a rotation ring including a plurality of second electromagnets having either an N polarity or an S polarity, the rotation ring being rotatably coupled to the body portion,
   wherein, when the polarities of the plurality of first electromagnets are sequentially changed, the rotation ring rotates according to a magnetic force of the plurality of first electromagnets and the plurality of second electromagnets.

2. The apparatus of claim 1, wherein the branch pipe includes a first branch pipe branching from the main pipe, an elbow pipe connected to the first branch pipe to change a flow direction of the fluid, and the second branch pipe connected to the elbow pipe, wherein the body portion is between the elbow pipe and the second branch pipe.

3. The apparatus of claim 1, wherein the plurality of first electromagnets are provided at intervals of 45° in a circumferential direction of the body portion, and
   the plurality of second electromagnets are provided in a pair facing each other.

4. The apparatus of claim 1, wherein an inner diameter of the body portion and an inner diameter of the rotation ring are equal to an inner diameter of the branch pipe.

5. The apparatus of claim 1, wherein an insertion groove into which the rotation ring is inserted is formed inside the body portion.

6. The apparatus of claim 5, wherein magnetic materials having a same polarity as the plurality of second electromagnets provided on the rotation ring are provided on both sides of the insertion groove facing side surfaces of the rotation ring.

7. The apparatus of claim 1, wherein protrusions are formed to protrude and to be spaced apart from each other at certain intervals on an inner circumferential surface of the rotation ring.

8. The apparatus of claim 7, wherein the protrusions are arranged at intervals of 90° on the inner circumferential surface of the rotation ring.

9. The apparatus of claim 1, wherein an insertion groove into which the rotation ring is inserted is formed inside the body portion, and
   a width of the insertion groove is greater than a width of the rotation ring, and an outer diameter of the insertion groove, formed when a bottom surface of the insertion groove is connected, is greater than an outer diameter of the rotation ring.

10. The apparatus of claim 1, wherein the body portion includes a first body coupled to one side of the branch pipe and including a first coupling hole spaced apart from each other in a circumferential direction, and a second body coupled to other side of the branch pipe and including a second coupling hole spaced apart from each other in a circumferential direction, the second coupling hole facing the first coupling hole,
   the first body and the second body are fastened by a fastening member inserted into the first coupling hole and the second coupling hole, and
   the first body includes a groove portion having one open side so that the rotation ring is inserted thereinto, and when the second body is fastened to the first body, the second body blocks the open side of the groove portion to form the insertion groove into which the rotation ring is inserted.

* * * * *